(12) United States Patent
Roffman et al.

(10) Patent No.: US 6,305,802 B1
(45) Date of Patent: Oct. 23, 2001

(54) SYSTEM AND METHOD OF INTEGRATING CORNEAL TOPOGRAPHIC DATA AND OCULAR WAVEFRONT DATA WITH PRIMARY AMETROPIA MEASUREMENTS TO CREATE A SOFT CONTACT LENS DESIGN

(75) Inventors: Jeffrey H. Roffman, Jacksonville, FL (US); Michael J. Collins, Mt. Nebo; Brett A. Davis, Cooparoo, both of (AU); Denwood F. Ross, III, Jacksonville, FL (US)

(73) Assignee: Johnson & Johnson Vision Products, Inc., Jacksonville, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,718

(22) Filed: Aug. 11, 1999

(51) Int. Cl.$^7$ ........................................... A61B 3/00
(52) U.S. Cl. ........................................ 351/212; 351/160 R
(58) Field of Search ........................................ 351/203, 204, 351/205, 211, 212, 160 R, 162, 177

(56) References Cited

U.S. PATENT DOCUMENTS

| | | |
|---|---|---|
| 4,579,430 | 4/1986 | Bille . |
| 5,062,702 | 11/1991 | Bille . |
| 5,110,200 | 5/1992 | Snook . |
| 5,114,628 | 5/1992 | Hofer et al. . |
| 5,212,507 | 5/1993 | Fujieda et al. . |
| 5,214,456 | 5/1993 | Gersten . |
| 5,452,031 | * 9/1995 | Ducharme ............................ 351/177 |
| 5,502,518 | 3/1996 | Lieberman . |
| 5,570,142 | 10/1996 | Lieberman . |
| 5,695,509 | 12/1997 | El Hage . |
| 5,777,719 | 7/1998 | Williams et al. . |
| 5,807,381 | 9/1998 | Lieberman . |
| 5,880,809 | 3/1999 | Lieberman et al. . |

\* cited by examiner

Primary Examiner—George Manuel
(74) Attorney, Agent, or Firm—Lois Gianneschi

(57) ABSTRACT

A system and method is provided for integrating corneal topographic data and ocular wavefront data with primary ametropia measurements to create a soft contact lens design. Corneal topographic data is used to design a better fitting soft contact lens by achieving a contact lens back surface which is uniquely matched to a particular corneal topography, or which is an averaged shape based on the particular corneal topography. In the case of a uniquely matched contact lens back surface, the unique back surface design also corrects for the primary and higher order optical aberrations of the cornea. Additionally, ocular wavefront analysis is used to determine the total optical aberration present in the eye. The total optical aberration, less any corneal optical aberration corrected utilizing the contact lens back surface, is corrected via the contact lens front surface design. The contact lens front surface is further designed to take into account the conventional refractive prescription elements required for a particular eye. As a result, the lens produced exhibits an improved custom fit, optimal refractive error correction and vision.

14 Claims, 2 Drawing Sheets

SYSTEM AND METHOD OF INTEGRATING CORNEAL TOPOGRAPHIC DATA AND OCULAR WAVEFRONT DATA WITH PRIMARY AMETROPIA MEASUREMENTS TO CREATE A SOFT CONTACT LENS DESIGN

FIELD OF THE INVENTION

The present invention generally relates to a system and method for improving the vision of the eye. More specifically, the present invention relates to a system and method of integrating corneal topographic data and ocular wavefront data with primary ametropia measurements to create a soft contact lens design.

BACKGROUND OF THE INVENTION

The surface topography of most human corneas is not spherical. Instead, the corneal surface typically changes at varying, unpredictable and unique rates from the center of the cornea out to the periphery in a manner which is unique to each individual cornea. The fit of contact lenses that rest on the cornea can take this corneal shape irregularity into account. Corneal topographic analysis using a corneal topographer is used to provide information about the shape on the cornea. Generally, a corneal videokeratoscope includes a camera, for example a charge coupled device or CCD camera, for sensing the images of rings or points or patterns of light reflected from the cornea. The camera transmits video signals to a computer, or other image processing device, which analyzes the camera signals and produces data used in determining the contour of the cornea of the human eye.

SUMMARY OF THE INVENTION

The present invention is for a system and method of integrating corneal topographic data and ocular wavefront data with primary ametropia measurements to create a soft contact lens design. According to the present invention, corneal topographic data is used to design a better fitting soft contact lens by achieving a contact lens back surface which is uniquely matched to a particular corneal topography, or which is an averaged shape based on the particular corneal topography. In the case of a uniquely matched contact lens back surface the unique back surface design also corrects for the primary and higher order optical aberrations of the cornea. Also, ocular wavefront analysis is used to determine the total optical aberration present in the eye. The total optical aberration, less any corneal optical aberration corrected by way of the contact lens back surface, is corrected by way of the contact lens front surface design. The contact lens front surface is also designed to take into account the conventional refractive prescription elements required for the particular eye. As a result, the lens produced in accordance with the present invention will exhibit an improved custom fit, and improved optimal refractive error correction and vision.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENT OF THE INVENTION

Figure 1:
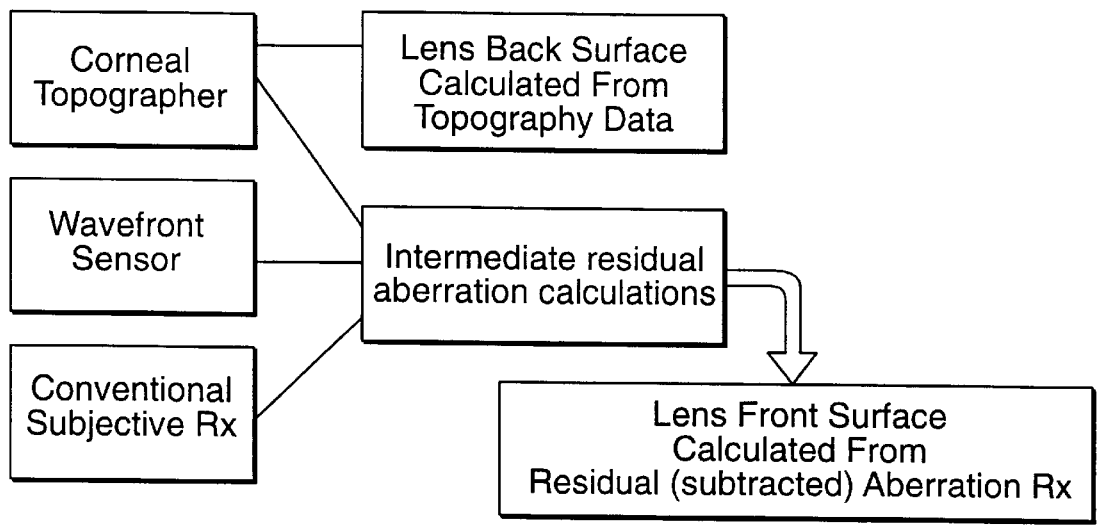
FIG. 1 is a block diagram of a system of integrating corneal topographic data and ocular wavefront data to create a soft contact lens design according to a first embodiment of the present invention.

The present invention utilizes various combinations of three elements that make up a system and method for designing a customized contact lens. These elements include ocular wavefront analysis, corneal topographic analysis, and basic sphere-cylindrical prescriptive analysis.

According to the present invention, the process starts by acquiring arbitrary corneal topographic information about a subject's eye. Any of a different number of methods for acquiring topographic data may be used, however, the topographic information is generally transformed to a form suitable for use in designing a customized contact lens. The original topographic data is acquired using a corneal topographer or videokeratoscope.

The elevational data may be transformed onto a grid pattern, which may be rectilinear, polar concentric, or of a spiral format to easily correspond to the mechanism by which the surface of a lens or lens mold may be tooled using a CNC (computer numeric control) lathe, or similar manufacturing system. Examples of such systems include direct machining of a polymer button, milling, laser ablation/machining, injection mold insert, or a deformable mold apparatus.

Initially, the elevational data is applied to the soft contact lens model in an unflexed estate. Also, the elevational data may be used to indicate minor variations in the back surface only, the front surface only, or a combination of the front and back surfaces, with respect to the mean corneal surface. Next, the data is transformed by taking into account the soft lens flexure (wrap) when the lens is placed on the eye. Typically, the back surface curvature of soft lenses are flatter, for example, by 1 to 1.5 mm, than the front surface curvature of the cornea that they are placed on. Thus, the effects of both elevation of the individual cornea and wrap are taken into account when utilizing the original topographic data in designing a soft contact lens surface or mold insert.

The flexure transformed elevation data may then be mapped onto the CNC grid pattern and utilized to make a soft contact lens or mold tool surface. The advantage of utilizing the transformed data is the ability to produce a lens, or mold insert, which exhibits fluctuations in thickness on the grid pattern which may or may not be rotationally symmetric about the center of the lens.

If the manufactured soft lens properly w raps to the underlying cornea, the fluctuations in surface elevation (above and below the mean spherical surface of the cornea) will be significantly neutralized. In this way, corneal aberrations and irregularities will be neutralized, and as a result, the optical aberrations due to irregular corneal topography will be eliminated.

Although knowing the overall corneal topography of the eye yields a great deal of information regarding the optimal fitting of a soft contact lens and the ocular aberrations due to the irregular corneal topography, it does not provide sufficient data for optimally correcting the total ocular aberrations of the eye. In particular, asphericity, gradient index structure of, and decentration (misalignment) of the crystalline lens, are generally beyond the capability of topographic measurement.

Ocular optical wavefront measurement may be carried out using, for example, the output of a crossed cylinder aberroscope, a device that measures ocular Modulation Transfer Function (MTF) via point spread or line spread, or any similar device which measures, estimates, interpolates or calculates the ocular optical wavefront.

The ocular optical wavefront information concerns the optical components of the eye, including the cornea, crystalline lens, system length, tilts, decentrations of the elements of the eye, asymmetrical irregularities, and asphericities. Although knowing the wavefront aberrations of the total eye yields a great deal of information, it nevertheless, does not provide any data which may be used to optimally fit a contact lens.

The required changes in lens surface elevation or slope to achieve correction of the total ocular wavefront aberration may be implemented on the back surface only, the front surface only, or some combination of both the front and back surfaces. The required surface elevation or slope changes will take into account the elevation changes required to fit and correct the irregularities in the corneal topography. Because the soft lens wraps to the underlying shape of the cornea, the combined elevation changes determined by the corneal topography and ocular wavefront aberration may be applied to the back surface only, the front surface only, or some combination of both front and back surfaces.

The present invention also utilizes conventional sphere-cylindrical prescriptive information. This information includes the distance sphere, distance astigmatic cylinder power and axis, and the near add power, if required. In one embodiment of the present invention, this information is determined using conventional subjective refraction techniques. Alternatively, the sphere, cylinder and axis are determined based on an analysis of the wavefront. This may be accomplished, for example, by reducing the Hartmann Shack wavefront data to Zernike coefficient terms, and using the relevant terms to derive the sphere, cylinder and axis information.

Referring now to FIG. 1, therein is illustrated a first embodiment according to the present invention. In this first embodiment, a corneal topographer is used to generate topographic data which is then used to define the contact lens back surface. The contact lens back surface is shaped to complement the corneal surface over which it is to be placed, also taking into account lens flexure or wrap. In this way, the contact lens back surface and the corneal surface cooperate similar to a "hand in glove" when the lens is on the eye. This topographically defined fit also cancels out most of the corneal optical aberrations. Also in this embodiment, a wavefront sensor is used to measure the sum total optical aberration of the eye. The optical aberrations due to the cornea which are neutralized by the back surface of the lens are subtracted out of the sum total optical aberration to yield a net residual optical aberration. The net residual optical aberration is compensated for by an appropriate design of the front surface of the contact lens. The contact lens front surface is also designed to compensate for the first order conventional prescriptive components, including sphere, cylinder, axis and prism.

Figure 2:
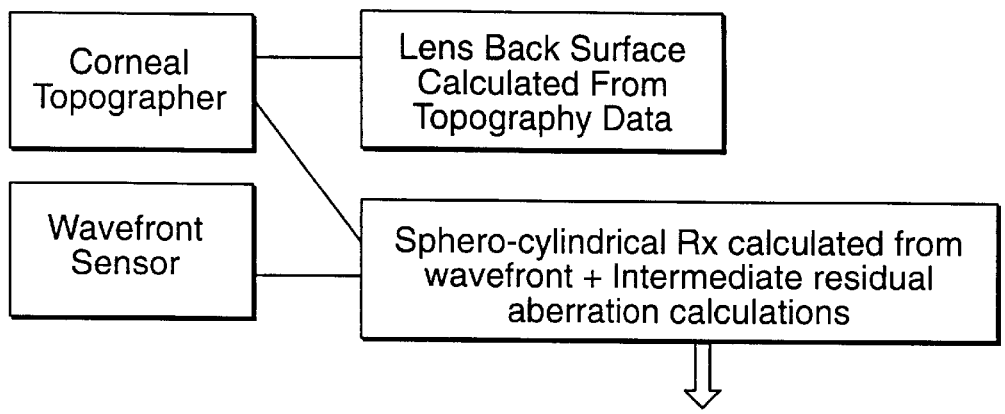
FIG. 2 is a block diagram of a system of integrating corneal topographic data and ocular wavefront data to create a soft contact lens design according to a second embodiment of the present invention.

Referring now to FIG. 2, therein is illustrated a second embodiment according to the present invention. In the second embodiment, a separate analysis to determine the conventional prescriptive component is not carried out. Instead, the conventional prescriptive component is determined from the optical wavefront data. This analysis involves evaluating optical path difference or aberration polynomials. In the second embodiment, the corneal optical aberrations are compensated for by an appropriate back surface design of the contact lens, similar to the first embodiment discussed above. Similarly, the total optical aberration of the eye is determined, and the corneal optical aberration is subtracted out from the total optical aberration to yield a residual optical aberration which is compensated for by an appropriate front surface contact lens design. Also, the front surface contact lens design takes into account the conventional prescriptive component needed for the particular eye.

Figure 3:
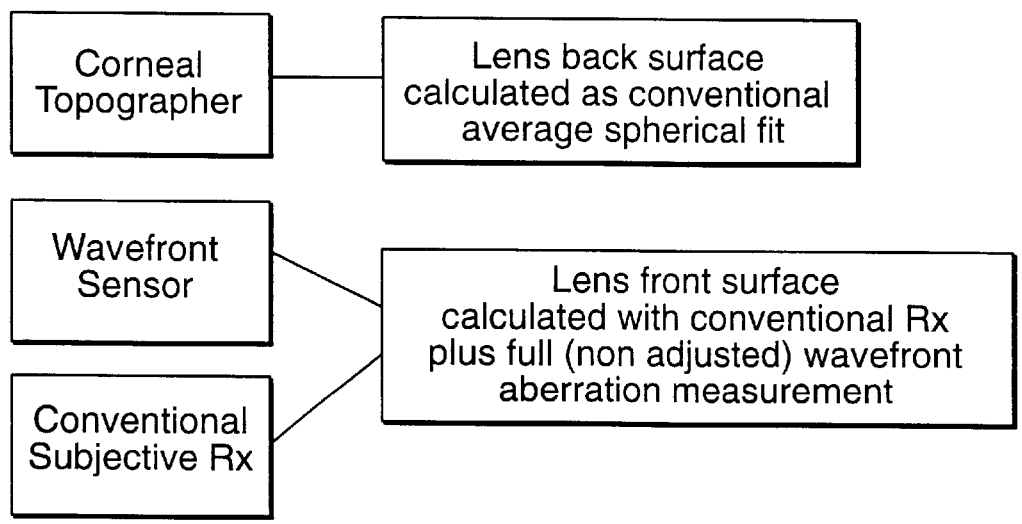
FIG. 3 is a block diagram of a system of integrating corneal topographic data and ocular wavefront data to create a soft contact lens design according to a third embodiment of the present invention.

Referring now to FIG. 3, therein is illustrated a third embodiment according to the present invention. In the third embodiment, a corneal topographer is used to generate topographic data concerning the corneal surface, and in particular, the irregularities in the corneal surface. However, instead of designing a contact lens back surface which is customized and uniquely complements the specific corneal surface, an arbitrary contact lens back surface (which may or may not be spherical) is used instead. As a result, the contact lens back surface will not compensate for all of the corneal optical aberrations. Instead, the corneal aberrations are compensated for by the front surface contact lens design, which also compensates for the remaining optical aberrations present in the eye, along with the conventional prescriptive components needed for the particular eye.

Having described various preferred embodiments of the present invention, those of skilled in the art will understand that the described arrangements are merely illustrative of the principles of the present invention, and the other arrangements and variations may be device without departing from the spirit and scope of the invention as claimed below.

We claims:

1. A method for designing a contact lens, comprising the following steps of:

acquiring corneal topographic information of an eye of a person using one of a corneal topographer and a videokeratoscope;

measuring a sum total optical aberration of the eye using a wavefront sensor;

utilizing the corneal topographic information to define a back surface of the contact lens; and shaping the substantially entire back surface of the lens to complement a corneal surface of the eye.

2. The method of claim 1, further comprising the following step of:

utilizing the corneal topographic information to calculate the back surface of the lens.

3. The method of claim 1, further comprising the following steps of:

subtracting optical aberrations due to the back surface of the lens, from the sum total optical aberration to generate a net residual optical aberration; and utilizing the net residual optical aberration to calculate a lens front surface.

4. The method of claim 1, further comprising the following step of:

utilizing the corneal topographic information to calculate the back surface of the lens;

wherein said back surface has an average spherical fit.

5. The method of claim 1, further comprising the following step of:

calculating a lens front surface using conventional prescriptive components and a full wavefront aberration measurement.

6. A method for designing a contact lens, comprising the following steps:

acquiring corneal topographic information of an eye of a person using one of a corneal topographer and videokeratoscope;

utilizing the corneal topographic information to define a back surface of the contact lens; and shaping the substantially entire back surface of the lens to complement a corneal surface of the eye.

7. The method of claim 6, further comprising the following step of utilizing the corneal topographic information to calculate the back surface of the lens.

8. The method of claim 6, further comprising the following steps of:

subtracting optical aberrations due to the back surface of the lens, from the sum total optical aberration to generate a net residual optical aberration; and utilizing the net residual optical aberration to calculate a lens front surface.

9. A system for designing a contact lens, comprising:

a corneal topographer for acquiring corneal topographic information of an eye of a person;

a device for utilizing the corneal topographic information to define a back surface of the contact lens; and a device for shaping the substantially entire back surface of the lens to complement a corneal surface of the eye.

10. The system of claim 9, further comprising:

a device for calculating the back surface of the lens based on the corneal topographic information.

11. The system of claim 9, further comprising:

a device for subtracting optical aberrations due to the back surface of the lens, from the sum total optical aberration to generate a net residual optical aberration; and a device for calculating a lens front surface based on the net residual optical aberration.

12. A system for designing a contact lens, comprising:

a corneal topographer for acquiring corneal topographic information of an eye of a person; and a wavefront sensor for measuring a sum total optical aberration of the eye.

13. The system of claim 12, further comprising:

a device for calculating the back surface of the lens based on the corneal topographic information; and a device for calculating an arbitrary lens back surface from the sum total optical aberration of the eye and intermediate residual aberration calculations.

14. The system of claim 12, further comprising:

a device for subtracting optical aberrations due to the back surface of the lens, from the sum total optical aberration to generate a net residual optical aberration; and a device for calculating a lens front surface based on the net residual optical aberration.

* * * * *